United States Patent [19]

Pike

[11] Patent Number: 4,585,098

[45] Date of Patent: Apr. 29, 1986

[54] FILAMENT-REINFORCED COMPOSITE TRANSMISSION BRAKE BAND

[75] Inventor: Ronald J. Pike, New Baltimore, Mich.

[73] Assignee: D.A.B. Industries, Inc., Troy, Mich.

[21] Appl. No.: 544,605

[22] Filed: Oct. 24, 1983

Related U.S. Application Data

[63] Continuation-in-part of Ser. No. 389,843, Jun. 18, 1982, abandoned.

[51] Int. Cl.$^4$ .............................................. F16D 65/06
[52] U.S. Cl. ................... 188/251 A; 188/249; 188/250 B; 188/259; 192/109 B
[58] Field of Search ............... 188/251 A, 251 R, 259, 188/249, 250 H, 250 R, 250 B, 204 A; 267/148, 149; 192/107 M, 109 B

[56] References Cited

U.S. PATENT DOCUMENTS

| | | | |
|---|---|---|---|
| 1,432,758 | 10/1922 | Kendall | 188/249 |
| 1,771,749 | 7/1930 | Eisenhardt | 428/114 |
| 2,551,474 | 5/1951 | Tilden | 188/251 A |
| 2,656,015 | 10/1953 | Lapsley | 188/77 R |
| 2,713,923 | 7/1955 | Eksergian et al. | 188/251 A |
| 2,728,701 | 12/1955 | Wirth | 188/251 A |
| 2,969,971 | 1/1961 | Nelson | 267/149 |
| 3,265,167 | 8/1966 | Yazell, Jr. | 188/250 BX |
| 3,386,535 | 6/1968 | Bishop et al. | 188/77 R |
| 3,475,264 | 10/1969 | Donaldson | 428/114 X |
| 3,537,549 | 11/1970 | Ely | 192/80 X |
| 3,756,905 | 9/1973 | Mills et al. | 428/114 |
| 3,881,982 | 5/1975 | Morgan | 188/251 A |
| 3,900,357 | 8/1975 | Huchette et al. | 267/47 X |
| 4,024,933 | 5/1977 | Hinderks | 188/259 |
| 4,173,681 | 11/1979 | Durrieu et al. | 188/251 A |
| 4,197,352 | 4/1980 | Emmett et al. | 188/251 A |

FOREIGN PATENT DOCUMENTS

| | | | |
|---|---|---|---|
| 2731577 | 1/1979 | Fed. Rep. of Germany | 267/149 |
| 2021731 | 12/1979 | United Kingdom | 267/149 |

*Primary Examiner*—George E. A. Halvosa
*Assistant Examiner*—Michael P. Gilday
*Attorney, Agent, or Firm*—Barnes, Kisselle, Raisch, Choate, Whittemore & Hulbert

[57] ABSTRACT

A friction band comprising an arcuate band or strap made of a filament-reinforced plastic material. The plastic material is preferably a thermosetting epoxy which provides a matrix in which are embedded or encapsulated a plurality of long-strand continuous filaments of glass or the like. The band is lined with a friction lining, and is reinforced by a fibrous bleeder cloth between the band and the friction lining. A special fixture applies tension to the band assembly to hold the filaments in tension during the curing of the plastic material forming the matrix of the band.

8 Claims, 7 Drawing Figures

FILAMENT-REINFORCED COMPOSITE TRANSMISSION BRAKE BAND

REFERENCE TO RELATED APPLICATION

This application is a Continuation-in-Part of my prior co-pending application, Ser. No. 389,843 filed June 18, 1982, now abandoned.

This invention relates generally to friction bands and refers more particularly to a fiber or filament-reinforced composite transmission/brake band.

BACKGROUND AND SUMMARY OF THE INVENTION

Transmission and brake bands now in use are made substantially entirely of steel components with the usual friction lining material secured to the inner surface. The manufacture of steel brake bands requires numerous operations, including welding and mechanical fastening, both in the fabrication of the components and in the final assembly.

The friction band of the present invention is made of a length or strap of filament-reinforced composite material containing a plurality of long-strand, continuous filaments of glass or the like embedded or encapsulated in a resinous plastic material matrix such as epoxy. Preferably the ends of the filament-reinforced composite band are doubled over the apply and reaction lugs, providing a strong connection in which the load transfer from the lugs to the band is evenly distributed. In conventional designs, the load is transmitted through welds or rivets which constitute weak points.

The band is manufactured by curing the plastic matrix while wrapped around a cylindrical mandrel to provide its final shape, at the same time maintaining the filaments in tension so that in the final product the filaments are straight and parallel to one another. If the filaments are not held in tension during molding, they tend to transmit forces unevenly when the band is in service, with the possibility of cracking the plastic matrix of the band and causing transverse separation.

Preferably a length of fibrous reinforcing material is interposed between the composite band and the friction lining. The reinforcing material further strengthens the band, especially in a transverse direction.

It has been found that during molding, the plastic matrix becomes flowable or liquid as its temperature rises to the necessary curing temperature, and the plastic run-off may get on the friction lining, which, of course, is undesirable. However, the fibrous reinforcing material has the ability to soak up or absorb the run-off. The plastic which is absorbed by and impregnated into the fibrous reinforcing material has the advantage of further strenthening the latter.

DETAILED DESCRIPTION

Figure 2:
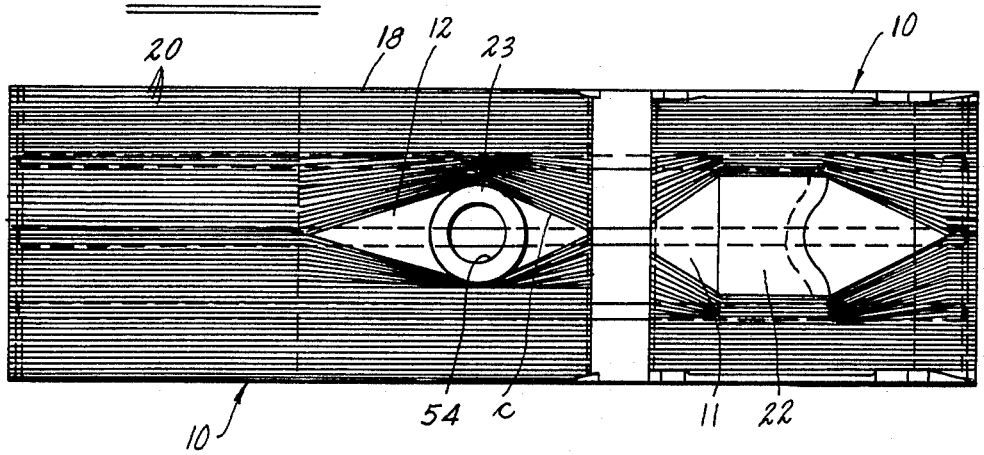
FIG. 2 is a top plan view of the structure shown in FIG. 1.
Figure 1:
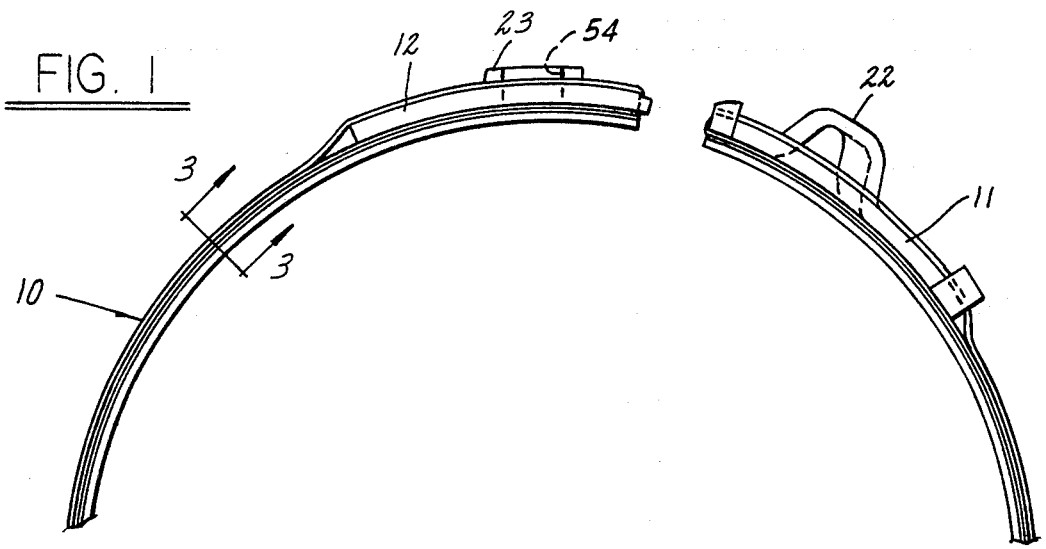
FIG. 1 is a front elevational view, with parts broken away, of a friction band constructed in accordance with the invention.
Figure 3:
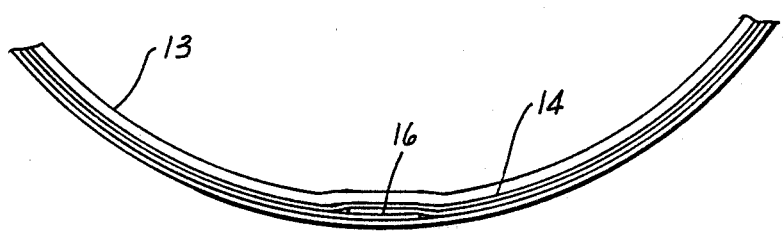
FIG. 3 is a sectional view taken on the line 3—3 in FIG. 1.
Figure 3:
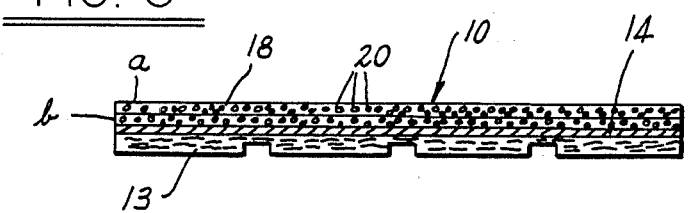
Figure 4:
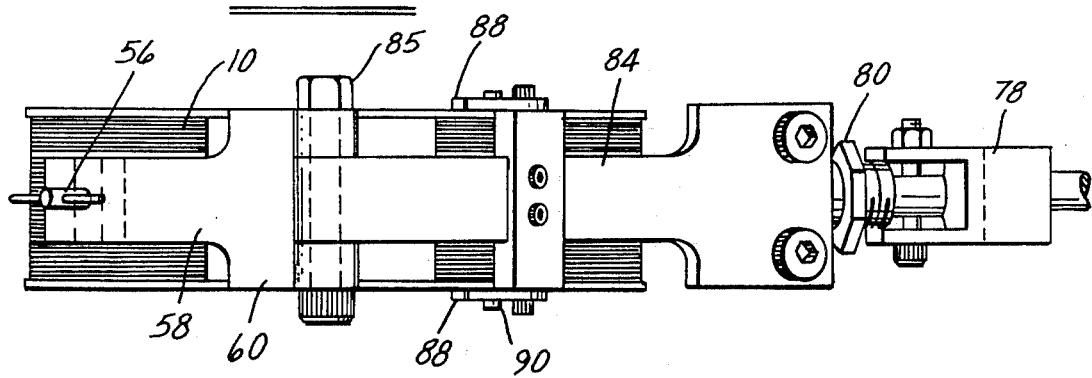
FIG. 4 is a top plan view of a fixture employed in the manufacture of the brake band.

Referring now more particularly to the drawings and especially to FIGS. 1-3, a friction band is shown composed of an arcuate strap 10 having apply and reaction lugs 11 and 12 of steel or the like at the adjacent ends for receiving the actuating force, a strip 13 of friction lining material along the radially inner surface of the strap, and a length of fibrous reinforcing material 14 interposed between the strap 10 and the friction lining strip 13. The length of reinforcing material 14 and the friction lining strip 13 are coextensive and are shown as being of the same length as the strap 10 although they may terminate short of the reaction lug end if desired.

The strap 10 is substantially cylindrical throughout almost a full 360° except for the gap between the adjacent ends. The strap is continuous and uninterrupted between its ends, the portions broken away in FIG. 1 being like those portions actually shown.

The strap 10 is made of a filament-reinforced resinous plastic material consisting of a plastic matrix 18 in which are embedded a plurality of long-strand filaments 20 which are co-extensive in length with the plastic matrix and are arranged parallel to the length thereof. Preferably the plastic material matrix 18 is thermosetting epoxy, although other thermosetting plastics may be used. There no doubt are selected thermoplastics which may be suitable, provided that in use when the band is applied they do not soften from the heat generated in a particular application.

The reinforcing filaments may be made of many different materials provided that they meet strength requirements. Although glass is the preferred material of which the filaments are made, examples of other suitable materials are boron, graphite, Kevlar (trademark of DuPont), or a combination of these materials. The filaments are very fine, flexible thread-like strands or elements and may take many forms such, for example, as continuous strand rovings, woven rovings, woven fabrics, chopped strands and milled fibers.

The strip or length of fibrous reinforcing material is made of a multiplicity of fibers bonded together to form a thin, flexible, non-woven cloth sometimes referred to as a bleeder cloth. The product may be obtained from West Coast Paper Company in Seattle, Washington under the name Mochburg Grade CW 1850 bleeder cloth. The fibers of the bleeder cloth are preferably thermoplastic and heat-sealed together. Preferably they are made of a material selected from the group consisting of the vinyl family, the polyester family, the polyolyfin family, the polyamide family and any physical or chemical combination of these families. Examples of polyolyfins are polyethylene and polypropylene. An example of polyamide is nylon. Examples of vinyls are Saran, Vinyon and polyvinyl chloride (PVC). Saran is a polymer composed of at least 80% by weight of vinylidene chloride. Under the Textile Products Identification Act, any fiber containing 85% or more vinyl chloride may be labeled "Vinyon" and this includes 100% PVC fiber. The reinforcing material or bleeder cloth 14 is preferably on the order of 10 mils thick, very flexible and capable of absorbing or becoming impregnated with the plastic forming the matrix of the strap 10 as will become more apparent as this description proceeds.

The strap 10 may consist of one or more layers or plies of the filament-reinforced plastic material. In the embodiment shown, there are two such layers a and b formed from a single length of material which is folded over at the ends of the brake band and then back upon itself along the inner surface of the band, the ends of the folded-over portions terminating at the center of the band in a single overlap 16 seen clearly in FIG. 1. The lugs 11 and 12 have plate portions which are anchored within the folds of the strap 10 at the ends of the brake band. The folded end portions of the filament-reinforced plastic forming the strap are slit at c and d, without severing any of the filaments, and displaced to either side of the load bearing portions 22 and 23 of the lugs. The plate portions of the lugs are thus securely held in the folded end portions.

In order to make the friction band, the strap 10 is folded over the lugs in the manner described in the preceding paragraph while the plastic matrix 18 is in an uncured or partially cured state in which it is sqft and pliable and somewhat tacky, permitting the layers to be folded and pressed together by hand with ease. The bleeder cloth and friction lining strips 13 and 14 will then be applied over the inner surface of the folded strap, with the bleeder cloth between the friction lining 13 and the strap 10. Preferably a film of an adhesive is applied between the strips 13 and 14. The adhesive may, for example, be a synthetic rubber phenolic base adhesive which cures at about 325° F. The tackiness of the matrix material 18 of the strap 10 causes the bleeder cloth to stick in surface contact with the strip. The folded end portions of the strap 10 overlying the lugs are longitudinally slit between the strands 20 and spread to either side of the load bearing portions 22 and 23.

The friction band assembly consisting of the folded strap 10, lugs 11 and 12 and strips 13 and 14, is then formed to cylindrical shape as by being wrapped around a cylindrical mandrel and placed in an oven to cure or polymerize the plastic material 18, cure the adhesive between bleeder cloth and friction lining, and set the friction band in the shape and form shown. A suitable fixture having a form or mandrel about which the band may be wrapped during the time of curing in the oven is shown in FIGS. 4–7.

Referring now more particularly to FIGS. 4–7, the fixture there shown comprises a form or mandrel 50 which is cylindrical in shape and has a radially outwardly extending rim 52 along each side edge. The friction band assembly consisting of strap 10, lugs 11 and 12 and strips 13 and 14, is adapted to be wrapped around the mandrel or form 50, its side edges confined between rims 52. The load bearing portion 23 of reaction lug 12 has a hole 54 which is engaged by a radially extending anchor pin 56 axially slidably movable in a passage formed in the arm 58 of anchor block 60 mounted on the mandrel, to anchor lug 12. The pin 56 is urged radially inwardly for engagement in the hole 54 by a coil spring 62 which encircles the pin and is compressed between a collar 64 on the pin and the arm 58. The pin can be retracted radially outwardly by hand by pulling on the cross member 66 on the outer end of the pin, to release the lug.

The apply lug 11 has a load bearing portion 22. One end of the pin 70 is engageable with the bearing portion 22 and is operative to apply tangential force thereon in a direction to tension the band. As seen in FIG. 2, the pin is axially slidably mounted in a support 72 on a line extending along the line of tangential force. The pin is normally urged to the left in FIG. 2 in a direction to tension the band by a coil spring 74 which encircles the pin and is compressed between a collar 76 on the pin and the end of the support 72. The pin 70 can be retracted against the action of spring 74 by lever 78 pivoted on the opposite end of the pin and having a cam surface engageable with the abutment 80 on the support. The abutment 80 is an axially adjustable nut threaded on the support. The pin 70 is retracted when the lever 78 is pivoted from the solid to the dotted line position in FIG. 2, by the interaction of the cam surface 79 on the lever and the abutment 80. It should be noted that the support 72 for the pin 70 is externally threaded and is threadedly mounted in a passage in the arm 82 of the pivoted support block 84. Thus the support 72 may be adjusted lengthwise of pin 70.

Figure 5:
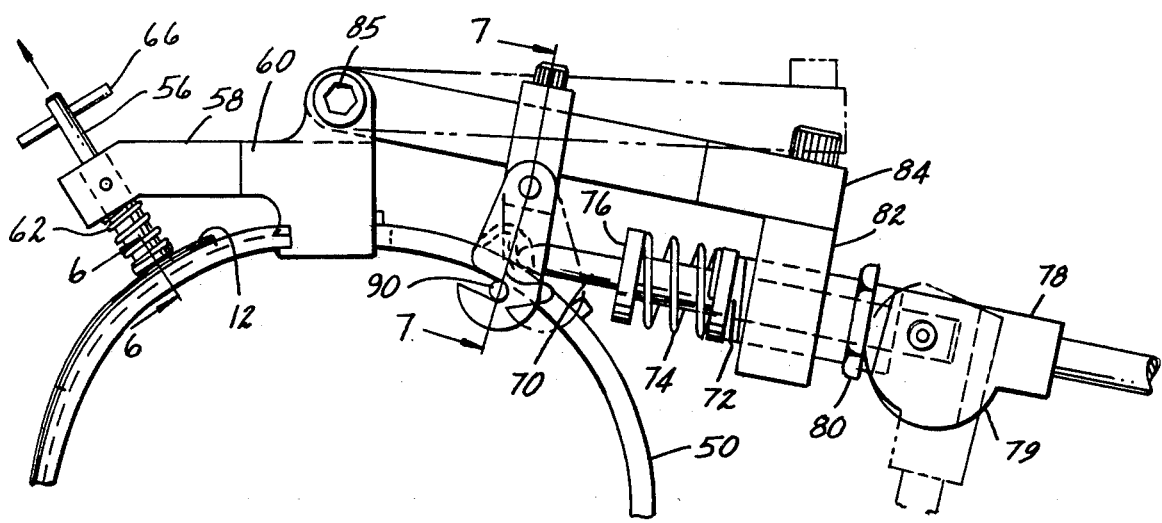
FIG. 5 is a front elevational view with parts broken away of the structure shown in FIG. 4.
Figure 6:
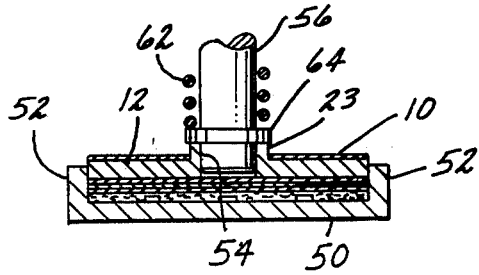
FIG. 6 is a sectional view taken on the line 6—6 in FIG. 5.
Figure 7:
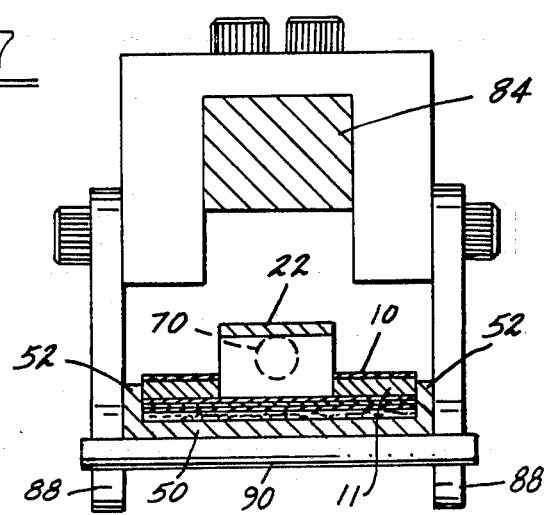
FIG. 7 is a sectional view taken on the line 7—7 in FIG. 5.

The pivoted support block 84 is connected to the anchor block 60 by pin 85 for swinging movement from the operative solid line position in FIG. 5 to a retracted position shown in dotted lines in which pin 70 is retracted away from the mandrel to permit loading and unloading of a brake band assembly. Latches 88 pivoted to the support block 84 are engageable with pins 90 on the mandrel to releasably lock the pivoted support block in the operative solid line position of FIG. 5.

After a brake band assembly is loaded on the fixture in the manner shown in FIGS. 4–7 of the drawings, the support 72 may be adjusted in order to account for variations in the length of the band, and then the lever 78 is swung to the solid line position to release the pin 70 and allow it to apply tangential force on the bearing portion 23 of the lug 11. Preferably about 100 pounds of force or tension is thus applied to the brake band. That amount of tension is considered enough to sufficiently tension the filaments 20, holding them straight and parallel with the longitudinal center line of the strap and in a taut condition during curing of matrix 18.

The fixture with the band assembly thus mounted on it and with the strap held in tension is then placed in an oven to cure or polymerize the plastic material of the matrix 18 of the strap, thus hardening the matrix and setting the strap 10 in the shape and form shown, and also curing the adhesive between the bleeder cloth and the friction lining to permanently bond them together. When the plastic material 18 is a thermosetting epoxy, the oven temperature will be approximately 325° F., which is sufficient also to cure the adhesive. The curing time may vary from one to several hours, as desired. The curing of the plastic matrix 18 while in contact with the lugs 11 and 12 causes the lugs to be securely and permanently anchored or adhered in the folds at the ends of the strap. As the temperature of the band assembly rises and before it reaches the oven temperature of 325° F., the plastic material of the strap matrix passes through a flowable or liquid phase. In this liquid phase, some of the plastic matrix material is absorbed by and impregnated into the bleeder cloth 14 which acts somewhat in the nature of a sponge. The result is a controlled cure of the matrix 18 without run-off into the lining material of the friction strip 13. In addition, the bleeder cloth itself becomes bonded to the strap 10 and also is made stronger, to provide additional reinforcement in the completed band, particularly in a transverse direction.

The filaments 20 are not affected by the curing and molding operation.

Because the filaments 20 are held taut during curing and molding in the oven, the filaments will be retained in a straight condition by the cured and set matrix 18. As such, the filaments are straight and parallel and will transmit torque evenly, hence eliminating or at least substantially reducing the tendency of the strap to crack or fail.

In the completed, molded band, the bump shown at the overlap in FIG. 1 virtually disappears because the overlapping layers partially fuse together. Also, it should be understood that the bump in FIG. 1 is greatly exaggerated for purposes of illustration.

The resulting bands have improved performance and manufacturing advantages over the welded and riveted steel bands traditionally used in transmissions and brakes. The materials employed provide a substantial weight reduction and at the same time high fatigue strength and a substantial increase in flexibility. The strap 10, when set and hardened by the curing in the oven, is exceptionally flexible and resilient for compliance with a braking surface. The increased flexibility of the brake band, as compared with conventional steel bands, is important because it provides for better, more uniform band to drum contact, for increase in the energy capability of the friction lining and for reduction of wear and thermal damage to the mating drum.

The composite material used in the manufacture of these bands has other advantages over the carbon and alloy steels traditionally used to make these parts. The glass fiber reinforcement gives unidirectional strength properties that lie along the direction of loading. These unidirectional properties include high specific tensile strength and high elastic stiffness. Tensile strength of the band is many times that of mild steel. The band may be very thin because of the high elastic stiffness of the glass filaments in the direction of loading and by the flexibility of the plastic matrix in the axial direction. Together these factors provide substantial improvements in flexibility and conformability of the band, assuring a uniform band to drum contact and thus minimizing wear of the band and drum and eliminating hot spots that might otherwise occur during abusive engagement of the brake or transmission parts. These hot spots often result from drum warpage.

I claim:

1. A friction band assembly comprising an arcuate band having adjacent end portions provided with load transfer lugs, said arcuate band comprising an elongated strap of filament-reinforced plastic material extending from one end portion of said arcuate band to the other, a strip of friction material extending along the radially inner side of said strap of filament-reinforced plastic material, said strap of plastic material comprising a multiplicity of continuous, elongated, pretensioned, flexible reinforcing filaments embedded in a plastic matrix and extending lengthwise of said strap and circumferentially of said arcuate band from one end portion thereof to the other, said strap of filament-reinforced plastic material having a length which at the ends of said arcuate band is folded back circumferentially upon itself and over said lugs to anchor said lugs in the folds thereof in a manner such that the loading of said arcuate band, as transferred by said lugs, is tensile and coincident with said circumferentially extending flexible reinforcing filaments, and a length of reinforcing material between said strap of filament-reinforced material and said strip of friction material, some of the plastic of said plastic matrix penetrating and impregnating said length of reinforcing material to strengthen the latter and bond it to said strap of filament-reinforced material.

2. A friction band as defined in claim 1, wherein said length of reinforcing material is made of a multiplicity of fibers.

3. A friction band as defined in claim 1, wherein said length of reinforcing material is made of a multiplicity of fibers bonded together.

4. A friction band as defined in claim 1, wherein said length of reinforcing material is made of a multiplicity of fibers heat sealed to one another.

5. A friction band as defined in claim 1, wherein said fibers are made of material selected from the group consisting of the vinyl family, the polyester family, the polyolyfin family, the polyamide family, and any physical combination of said families, and any chemical combination of said families.

6. A friction band assembly comprising an arcuate band having adjacent end portions provided with load transfer lugs, said arcuate band comprising an elongated strap of filament-reinforced plastic material extending from one end portion of said arcuate band to the other, and a strip of friction material extending along the radially inner side of said strap of filament-reinforced plastic material, said strap of plastic material comprising a multiplicity of continuous, elongated, pretensioned, flexible reinforcing filaments embedded in a plastic matrix and extending lengthwise of said strap and circumferentially of said arcuate band from one end portion thereof to the other, said strap of filament-reinforced plastic material having a length which at the ends of said arcuate band is folded back circumferentially upon itself and over said lugs to anchor said lugs in the folds thereof in a manner such that the loading of said arcuate band, as transferred by said lugs, is tensile and coincident with said circumferentially extending flexible reinforcing filaments.

7. A friction band as defined in claim 6, wherein said strap of filament-reinforced plastic material has superimposed plastic layers each reinforced with a multiplicity of said continuous, elongated, pretensioned, reinforcing filaments.

8. A friction band as defined in claim 7, wherein said layers are portions of a single member folded upon itself at the ends of said arcuate band to form said folds in which said lugs are anchored as aforesaid.

* * * * *